US012801997B2

(12) United States Patent
Möller et al.

(10) Patent No.: US 12,801,997 B2
(45) Date of Patent: Nov. 17, 2026

(54) AUTOMATIC REMOVAL OF SELECTED TRAINING DATA FROM DATASET

(71) Applicant: GM Cruise Holdings LLC, San Francisco, CA (US)

(72) Inventors: Sven Möller, Lubbecke (DE); Michael Meyer, Munich (DE); Marc Unzueta, Munich (DE); Filippo Grazioli, Heidelberg (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 591 days.

(21) Appl. No.: 18/460,414

(22) Filed: Sep. 1, 2023

(65) Prior Publication Data

US 2025/0077958 A1 Mar. 6, 2025

(30) Foreign Application Priority Data

Aug. 31, 2023 (EP) .................................... 23194559

(51) Int. Cl.
*G06N 20/00* (2019.01)

(52) U.S. Cl.
CPC .................................... *G06N 20/00* (2019.01)

(58) Field of Classification Search
CPC ........ G06N 20/00; G06N 3/09; G06N 3/0464; G06N 3/084; G06V 10/774; G06V 10/776; G06V 10/82
See application file for complete search history.

(56) References Cited

U.S. PATENT DOCUMENTS

| | | | | |
|---|---|---|---|---|
| 2020/0125956 | A1* | 4/2020 | Ravi | G06N 3/09 |
| 2022/0383648 | A1* | 12/2022 | Vineet | G06F 18/24133 |
| 2023/0385643 | A1* | 11/2023 | Rahman | G06N 3/082 |
| 2024/0104891 | A1* | 3/2024 | Takahashi | G06V 10/82 |

OTHER PUBLICATIONS

Kim et al. ("Large Loss Matters in Weakly Supervised Multi-Label Classification", Proceedings of the IEEE/CVF Conference on Computer Vision and Pattern Recognition (CVPR), 2022, pp. 14156-14165) (Year: 2022).*

(Continued)

*Primary Examiner* — Imad Kassim
(74) *Attorney, Agent, or Firm* — CANTOR COLBURN LLP

(57) ABSTRACT

Autonomous vehicles utilize perception to identify objects in a vehicle's surrounding environment and plan a trajectory. In perceiving an AV's surroundings, an object detection model uses sensor data from AV sensors to detect objects in the AV surroundings. An object detection model can be trained to detect objects using training datasets having sensor data and ground truth objects. In training, the object detection model uses the sensor data to identify objects in the locations of the ground truth objects. However, sometimes there is little or no sensor data corresponding to the ground truth objects, and the model is not able to learn patterns in sensor data to correctly detect the objects. Systems and methods are provided herein for removing ground truth objects that do not have sufficient corresponding sensor data from the training dataset, thereby preventing these objects from dominating the loss and interfering with the model learning useful patterns.

20 Claims, 11 Drawing Sheets

300

(56) References Cited

OTHER PUBLICATIONS

Shrivastava et al. ("Training Region-based Object Detectors with Online Hard Example Mining", 2016, Facebook AI Research, Carnegie Mellon University) (Year: 2016).*
European Search Report for European Application No. 23194559.3; dated Nov. 24, 2023; 2 pages.
Geoff Pleiss et al: "Identifying Mislabeled Data using the Area Under theMargin Ranking", arxiv.org, Cornell University Library, 201 Olin Library Cornell University Ithaca, NY 14853, Jan. 28, 2020.
Kim Youngwook et al: "Large Loss Matters in Weakly Supervised Multi-Label Classification", 2022 IEEE/CVF Conference on Computer Vision and Pattern Recognition (CVPR), IEEE, Jun. 18, 2022 (Jun. 18, 2022), pp. 14136-14145, 034192576, DOI: 10.1109/CVPR52688.2022.01376.
Zhou Tianyi et al: "Curriculum Learning by Dynamic Instance Hardness", NIPS 2021,Dec. 6, 2021 (Dec. 6, 2021), pp. 1-12, XP093105243, Retrieved from the Internet: URL:https://proceedings.neurips.cc/paper_files/paper/2020/file/62000dee5a05a6a71de3a6127a68778a-Paper.pdf.
Zhou Tianyi et al: "Robust Curriculum Learning: From Clean La-Bel Detection to Noisy Label Self-Correction", ICLR 2021, May 3, 2021 (May 3, 2021), pp. 1-18, XP093105242, Retrieved from the Internet: URL:https://openreview.net/pdf?id=lmTWnm3coJJ.

* cited by examiner

100

400

500

520

AUTOMATIC REMOVAL OF SELECTED TRAINING DATA FROM DATASET

PRIORITY INFORMATION

This application claims priority to European patent application number EP23194559.3 filed 31 Aug. 2023, titled "AUTOMATIC REMOVAL OF SELECTED TRAINING DATA FROM DATASET". The European patent application is hereby incorporated by reference in its entirety.

BACKGROUND

Technical Field

The present disclosure generally relates to autonomous vehicles (AVs) and, more specifically, to training models for AV perception.

Introduction

AVs, also known as self-driving cars, and driverless vehicles, may be vehicles that use multiple sensors to sense the environment and move without human input. Automation technology in AVs may enable vehicles to drive on roadways and to accurately and quickly perceive the vehicle's environment, including obstacles, signs, and traffic lights. Autonomous technology may utilize geographical information and semantic objects (such as parking spots, lane boundaries, intersections, crosswalks, stop signs, and traffic lights) for facilitating vehicles in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings.

DETAILED DESCRIPTION

Figure 1:
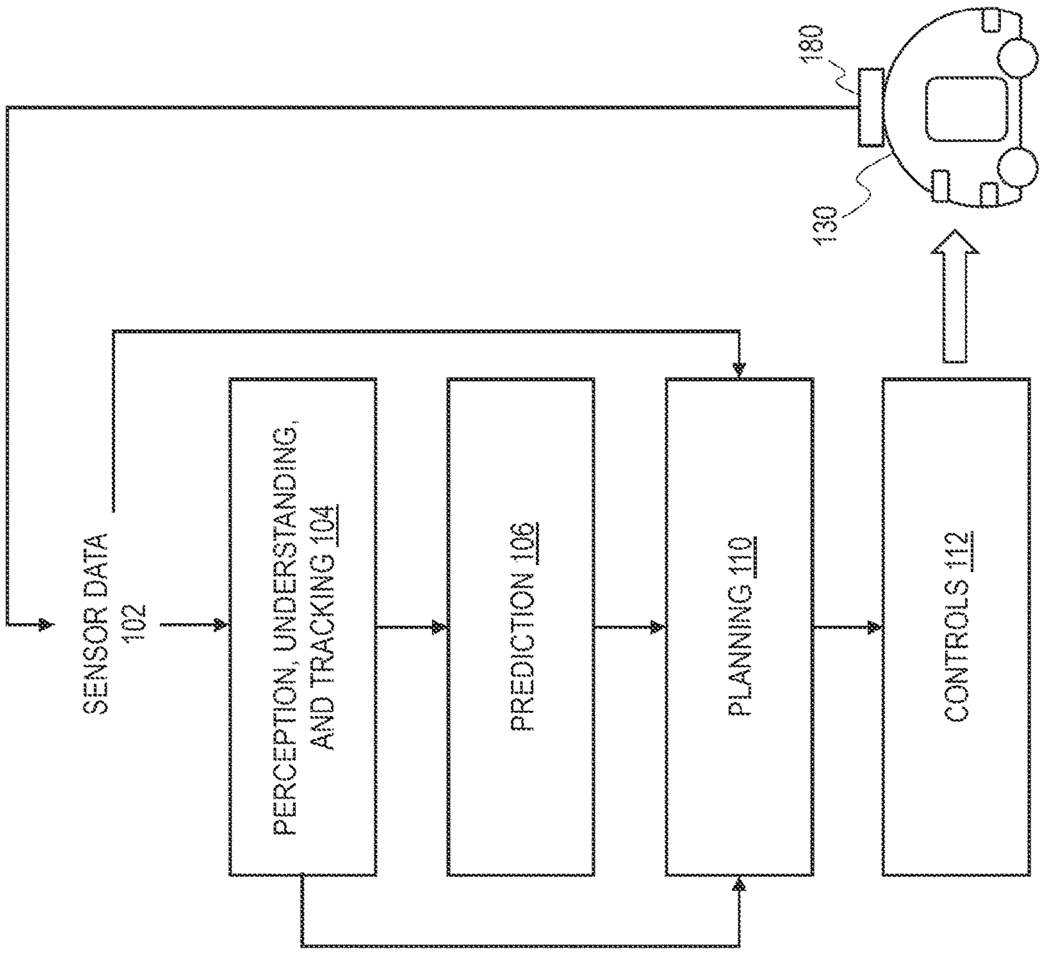
FIG. 1 illustrates an exemplary AV stack and an AV, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

AVs can provide many benefits. For instance, AVs may have the potential to transform urban living by offering an opportunity for efficient, accessible, and affordable transportation. AVs include multiple sensors and use sensor data to perceive AV surroundings, including both static and moving objects. AVs utilize perception and understanding of AV surroundings to plan a trajectory for the AV. The perception and understanding modules of an AV include artificial intelligence such as machine learning models that are trained using various training datasets.

In perceiving an AV's surroundings, AV perception and understanding modules detect objects in the AV's environment. An object detection model uses sensor data from various AV sensors to detect objects in the AV surroundings. In particular, an AV can include many different types of sensors, including, for example, cameras, light detection and ranging (lidar) sensors, radio detection and ranging (radar) sensors, time-of-flight sensors, accelerometers, gyroscopes, inertial measurement units, and the like. An object detection model can be trained to detect objects using datasets having data from various AV sensor modalities. The training dataset can include pre-labeled objects that the object detection model is to detect using sensor data. The pre-labeled objects can be represented as three-dimensional bounding boxes. The 3D bounding boxes are also referred to as ground truth (GT) objects. In training, the object detection model uses the sensor data to identify objects, and training includes identifying objects from sensor data in the locations of the ground truth objects. However, sometimes there is little or no sensor data corresponding to the ground truth objects. When the object detection model is trained on ground truth objects for which there is little or no sensor data, the model is not able to learn patterns in sensor data to correctly detect the objects because there is not enough sensor data to identify any patterns.

During the training process for an object detection model, when the object detection model fails to identify a ground truth object, the failure is considered a loss contribution. Over time, the loss contribution of each of the ground truth objects should decrease as the object detection model learns to recognize the objects. However, for ground truth objects without enough sensor data for the model to learn the sensor data pattern and learn to recognize the object, the loss contribution remains high over time. When there are many ground truth objects that do not have sufficient corresponding sensor data, these ground truth objects can dominate the training loss. In some examples, the presence of the ground truth objects that do not have sufficient corresponding sensor data can prevent the object detection model from learning useful patterns from the ground truth objects that do have sufficient sensor data.

Systems and methods are provided herein for removing ground truth objects that do not have sufficient corresponding sensor data from the training dataset. In some examples, an individual loss contribution for each ground truth object over a selected period of time while training the model is determined. Ground truth objects that have an individual loss contribution greater than a selected threshold can be down-weighted or entirely removed from the training dataset. In some examples, ground truth objects that have an individual loss contribution that is an outlier with respect to the individual loss contributions of other objects can be down-weighted or entirely removed from the training dataset. In some examples, the ground truth objects that do not have sufficient corresponding sensor data are removed online during training. In some examples, the ground truth objects that do not have sufficient corresponding sensor data are removed offline, following training. Removing the ground truth objects that do not have sufficient corresponding sensor data from the training dataset prevents these objects from dominating the loss and interfering with the model learning useful patterns.

Various embodiments herein and their advantages may apply to a wide range of vehicles (e.g., semi-autonomous vehicles, vehicles with driver-assist functionalities, etc.), and not just AVs.

Exemplary AV and an AV Stack that Controls the AV

FIG. 1 illustrates an exemplary AV stack and an AV 130, according to some aspects of the disclosed technology. An AV 130 may be equipped with a sensor suite 180 to sense the environment surrounding the AV and collect information (e.g., sensor data 102) to assist the AV in making driving decisions. The sensor suite 180 may include, e.g., sensor systems 704, 706, and 708 of FIG. 7. The AV stack may include perception, understanding, and tracking part 104, prediction part 106, planning part 110, and controls part 112. The sensor data 102 may be processed and analyzed by perception, understanding, and tracking part 104 to identify and track objects in the environment of the AV and determine a perception and understanding of the environment of the AV 130. In various examples, as described herein, the perception, understanding, and tracking part 104 can include an object detection model that is trained to detect objects in the AV's surroundings. Prediction part 106 may determine future motions and behaviors of the AV and/or tracked objects in the environment of the AV 130. The AV 130 may localize itself based on location information (e.g., from location sensors) and the map information. The planning part 110 may create planned paths or trajectories based on one or more of: information from perception, understanding, and tracking part 104, information from prediction part 106, the sensor data 102, map information, localization information, etc. Subsequently, planned paths or trajectories can be provided to controls part 112 to generate vehicle control commands to control the AV 130 (e.g., for steering, accelerating, decelerating, braking, turning on vehicle signal lights, etc.) according to the planned path.

The operations of components of the AV stack may be implemented using a combination of hardware and software components. For instance, an AV stack performing the perception, understanding, prediction, planning, and control functionalities may be implemented as software code or firmware code encoded in non-transitory computer-readable medium. The code for AV stack may be executed on one or more processor(s) (e.g., general processors, central processors (CPUs), graphical processors (GPUs), digital signal processors (DSPs), ASIC, etc.) and/or any other hardware processing components on the AV. Additionally, the AV stack may communicate with various hardware components (e.g., on-board sensors and control system of the AV) and/or with an AV infrastructure over a network. At least a part of the AV stack may be implemented on local computing device 710 of FIG. 7. At least a part of the AV stack may be implemented on the computing system 800 of FIG. 8 and/or encoded in instructions of storage device 830 of FIG. 8.

Exemplary Perception, Understanding, and Tracking Architecture

Figure 2:
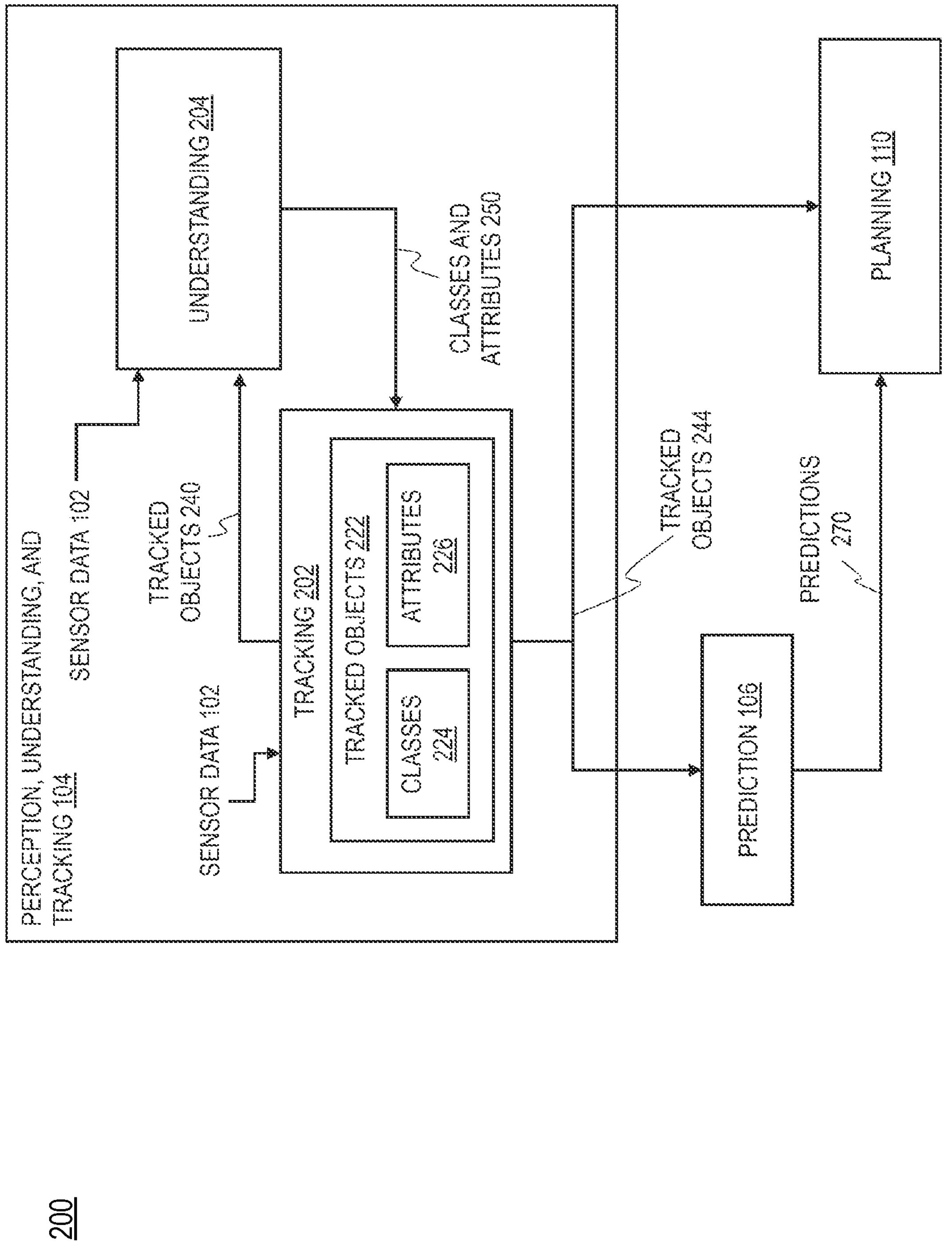
FIG. 2 illustrates an exemplary implementation of a perception, understanding, and tracking part, prediction part, and planning part, according to some aspects of the disclosed technology.

FIG. 2 illustrates an exemplary implementation of perception, understanding, and tracking part 104, prediction part 106, and planning part 110, according to some aspects of the disclosed technology. The figure illustrates one exemplary configuration and arrangement of parts within an AV stack and is not intended to be limiting to the disclosure.

Perception, understanding, and tracking part 104 may include tracking part 202 and understanding part 204. The tracking part 202 may receive sensor data 102 from a sensor suite of an AV (the sensor suite may include, e.g., sensor systems 704, 706, and 708 of FIG. 7). The tracking part 202 can include an object detection part, such as the object detection part 300 of FIG. 3, and may determine from the sensor data 102 presence of objects in an environment of the AV and track the objects presence over time (or across frames of data). The presence of an object can be encoded as a bounding box defining boundaries and location of an object in a three-dimensional space. The presence of an object can be encoded as location information and size information that specify the object's occupancy in space. The object detection part can be trained using a training model as disclosed herein.

Understanding part 204 may receive sensor data 102 and optionally tracked objects information 240 (of tracked objects 222) to understand the objects in the environment of the AV. Understanding part 204 may process sensor data 102, e.g., using one or more machine learning models, to produce inferences about the tracked objects 222, such as one or more classes and/or one or more attributes for tracked objects 222. Understanding part 204 may provide classes and attributes 250 as feedback information to tracking part 202. Directly or indirectly, classes and attributes 250 produced by understanding part 204 may be provided to prediction part 106 and/or planning part 110 to assist prediction and/or planning functionalities respectively.

As illustrated in the figure, tracking part 202 may serve as a classes and attributes collector and can collect and maintain classes 224 and/or attributes 226 for tracked objects 222. The objects and information associated with the objects may be maintained as tracked objects 222 in tracking part 202. Tracked objects 222 may be in a format of a database or collection of data that includes data entries for tracked objects 222, where each data entry for a tracked object may include information for the tracked object, such as an object identifier of the tracked object, bounding box of the tracked object, one or more classifications of the tracked object, and one or more attributes of the tracked object. Tracked objects 222 may be in a different format, e.g., such as a grid map or raster map of an environment surrounding the AV, whose pixels may store information for various tracked objects, such as an object identifier of the tracked object, bounding box of the tracked object, one or more classifications of the tracked object, and one or more attributes of the tracked object.

Perception, understanding, and tracking part 104 may provide tracked objects information 244 (of tracked objects 222) to prediction part 106. Perception, understanding, and tracking part 104 may provide tracked objects information 244 (of tracked objects 222) to planning part 110. Prediction part 106 may provide predictions 270 to planning part 110. Tracked objects information 240 and/or tracked objects information 244 may include at least some of the information maintained in tracked objects 222. Tracked objects information 244 provided from tracking part 202 to prediction part 106 and planning part 110 may include information produced by tracking part 202 and information produced by understanding part 204.

Exemplary Object Detection Part

Figure 3:
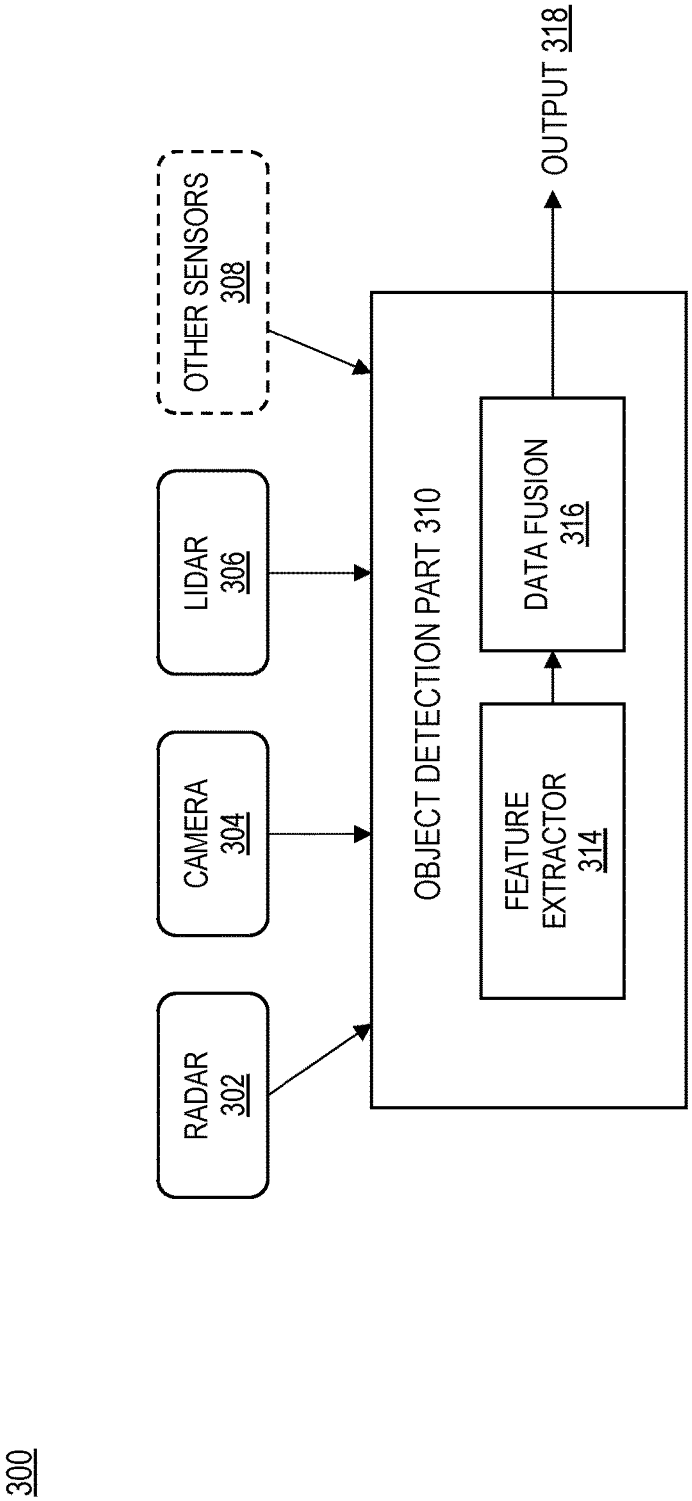
FIG. 3 is a block diagram illustrating an exemplary implementation of an object detection part, according to some aspects of the disclosed technology.

FIG. 3 is a block diagram illustrating an exemplary implementation of an object detection part 300, according to some examples of the present disclosure. According to various examples, the object detection part 300 can process radar 302 data, camera 304 data, lidar 306 data, and other sensor data 308 for processing. In some examples, the object detection part 300 primarily relies on camera 304 data and lidar 306 data to detect objects in an AV's environment, while data from radar sensors can provide additional information. The object detection part 310 can extract features from the sensor data and fuse data from the various sensors to detect objects in the vehicle environment. In some examples, the object detection part fuses extracted features data from the various data inputs. The object detection part 300 outputs detected object output 318, which includes the objects the object detection part 300 detected based on the radar 302 data input, camera 304 data input, lidar 306 data input, and other sensor input.

According to various examples, the object detection part 300 can be a part of the perception, understanding and tracking part 104 of FIGS. 1 and 2. The object detection part 300 can be trained using the systems and methods described herein, in which selected ground truth objects are down-weighted or removed from the training dataset during training. During training, the output 318 can be compared with the ground truth data in determining the loss contribution from each ground truth object.

Exemplary Training Method for an Object Detection Part

Figure 4A:
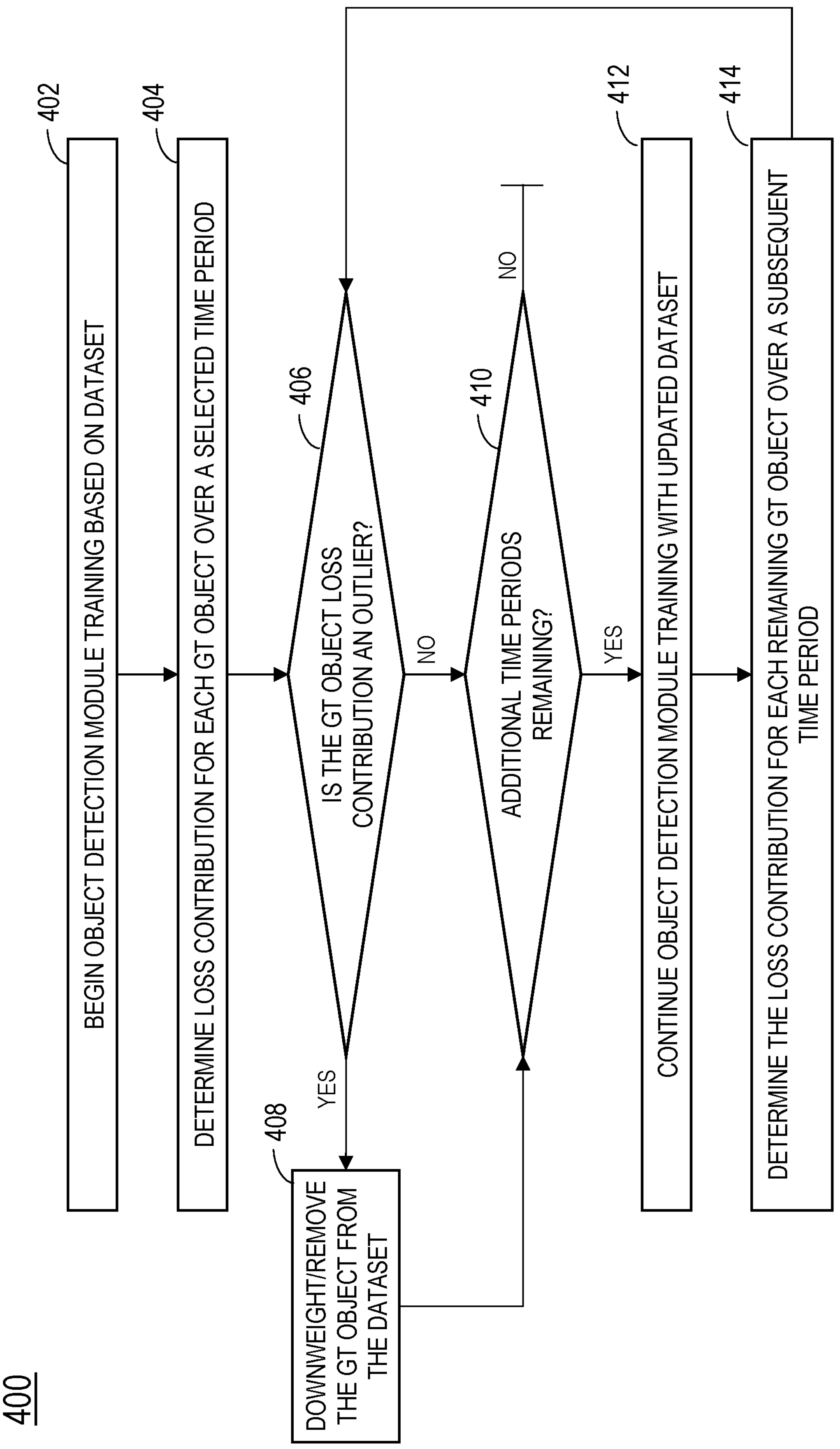
FIGS. 4A and 4B are flowcharts illustrating methods for automatically removing selected ground truth data from a dataset, according to some aspects of the disclosed technology.
Figure 4B:
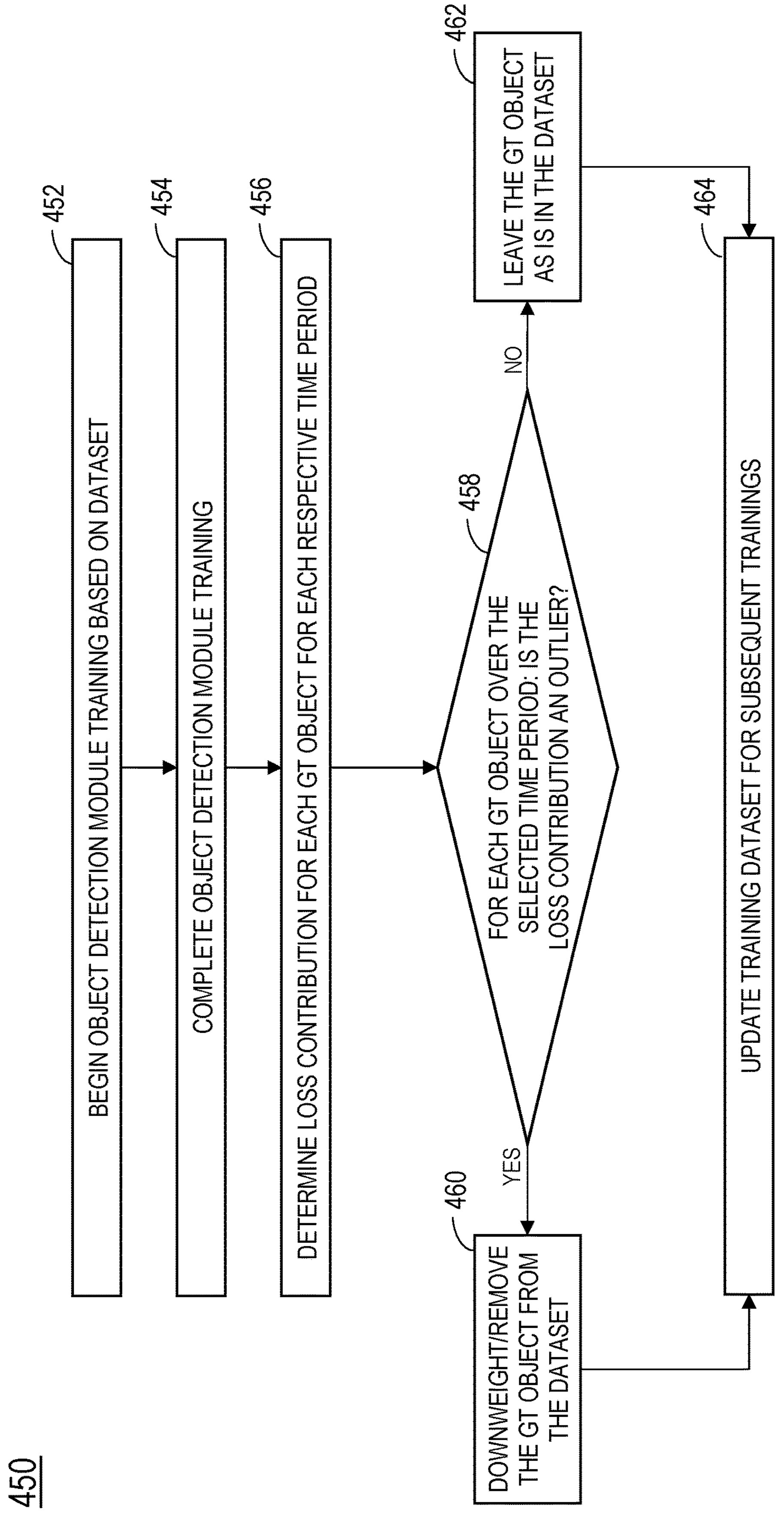

FIGS. 4A and 4B are flowcharts illustrating methods 400, 450 for automatically removing selected ground truth data from a dataset, according to various examples of the present disclosure. In particular, FIG. 4A illustrates an exemplary method 400 for automatically removing selected ground truth data from a dataset during training of an object detection part. FIG. 4B illustrates an exemplary method 450 for automatically removing selected ground truth data from a dataset following training of an object detection part. In some examples, the method 400 of FIG. 4A can be performed online during the training of the object detection part, and the method 450 of FIG. 4B can be performed offline after completion of the training of the object detection part.

The method 400 begins at step 402, as object detection module training begins. The object detection module can receive a dataset having multiple frames, each frame including ground truth objects (already labeled objects) and sensor data. In various examples, the ground truth objects can be automatically labeled and/or manually labeled. In some examples, each frame can represent a selected vehicle location at a selected time. As discussed above, the sensor data can include, for example, cameras, lidar sensors, radar sensors, time-of-flight sensors, accelerometers, gyroscopes, inertial measurement units, and the like. The ground truth objects can be represented as 3D bounding boxes, and the bounding boxes can be rotated to reflect the position of the ground truth object. In some examples, the ground truth objects are manually labeled in a subset of the frames, such as one in ten frames or one in thirty frames, and the manually labeled ground truth objects in the subset of frames are interpolated to other frames. In some examples, the ground truth objects are auto-labeled in a subset of the frames using tracked objects from the AV stack, and the auto-labeled ground truth objects in the subset of frames are interpolated to other frames. The labels in the ground truth objects can be incorrect, for example due to interpolation errors or due to labeler mistakes. Thus, although the ground truth objects are presumed to be accurately represented, this is not always the case. When the object detection module is trained on a dataset that includes inaccurate ground truth objects, the sensor data may not correspond with the incorrect ground truth objects, interfering with training.

More specifically, the object detection module identifies predicted objects based on the sensor data. The identified predicted objects should each correspond with a respective ground truth object. In particular, in some examples, a goal of training is to teach the object detection module to detect the ground truth objects (i.e., the pre-labeled objects) based on the sensor data. However, according to some examples, incorrectly labeled ground truth objects will not have corresponding sensor data allowing for corresponding predicted object identification. Additionally, in some examples, the sensor data can be insufficient for detection of one or more of the ground truth objects. Sensor data can be insufficient for multiple reasons, such as sensor occlusion, sensor data obfuscation due to weather or other environmental conditions, or interfering objects blocking a sensor view of a ground truth object. Ground truth objects that are not covered by sufficient sensor data for detection of a corresponding predicted object interfere with object detection module training. When the object detection model is trained on ground truth objects for which there is little or no sensor data, the model is not able to learn patterns in sensor data to correctly detect the objects because there is not enough sensor data to identify any patterns. Thus, to improve training and improve performance of the object detection module, ground truth objects for which there is little or no corresponding sensor data are removed from the training dataset.

During the training process for an object detection module, when the object detection model fails to identify a ground truth object, the failure is considered a loss contribution. To identify the ground truth objects for which there is little or no corresponding sensor data, the loss contribution for each individual ground truth object in the training process is tracked over time. Over time, the loss contribution of each of the ground truth objects should decrease as the object detection model learns to recognize the objects. However, for ground truth objects without enough sensor data for the model to learn the sensor data pattern and learn to recognize the object, the loss contribution remains high over time. When there are many ground truth objects that do not have sufficient corresponding sensor data, these ground truth objects can dominate the training loss. In some examples, the presence of the ground truth objects that do not have sufficient corresponding sensor data can prevent the object detection model from learning useful patterns from the ground truth objects that do have sufficient sensor data. Systems and methods are provided herein for down-weighting or removing ground truth objects that do not have sufficient corresponding sensor data from the training dataset. According to the systems and methods provided herein, the ground truth objects that do not show improvements (decreasing loss contributions) are down-weighted or removed from the training dataset.

At step 404, the loss contribution for each individual ground truth object over a selected period of time is determined. The selected period of time can include one or more epochs. In some examples, when the loss from a particular ground truth object remains high over several epochs, the ground truth object should be removed or down-weighted. In various examples, the contribution loss is computed in a way that tracks the loss contribution from each ground truth object individually in a training scene. In some examples, the sensor data is used to detect objects using anchor-based detection, and the loss from each anchor is assigned to a corresponding ground truth object. An anchor is a pre-defined and/or pre-generated object type that has a selected defined size and aspect ratio. In one example, from a birds-eye view of a frame, there is a grid of anchors, with each anchor being a potentially detected object and at least a subset of the anchors are then assigned to the closest ground truth object in the frame. In some examples, anchors without a nearby ground truth object are considered background. There are various strategies for assigning anchors to ground truth objects. One method for assigning anchors to ground truth objects is to determine an intersection over union (IoU) value for each anchor to each ground truth object in the scene. The anchors can then be assigned to ground truth objects based on the IoU value. For example, if a first anchor has an IoU over 50% with a first ground truth object, the first anchor is assigned to the first ground truth object. In another example, if the highest IoU for the first anchor with any of the ground truth objects is between 40% and 50%, the first anchor is ignored in the training. In another example, if the highest IoU of the first anchor is lower than 40%, the first anchor is considered background. In some examples, there is no "ignore" region between ground truth objects (foreground) and background. In some examples, the IoU threshold values (e.g., 50%, 40%-50%, below 40%) can be different threshold values.

In some examples, each ground truth object has a ground truth object ID and each frame has a scene ID, and the loss contributions are stored for each ground truth object ID and for each scene ID. In some examples, for each epoch of the training dataset, one loss contribution value is determined for each ground truth object ID for each scene ID. Thus, there is one loss contribution value per {object ID, scene ID} pair for each time period, for instance for each epoch. In some examples, a region proposal network (RPN) can be used for object detection and for matching anchors with ground truth objects.

Once the loss contribution for each ground truth object is determined at step 404, the method 400 determines which ground truth objects to remove from the training dataset based on the loss contributions. At step 406, for each ground truth object, it is determined if the ground truth object loss contribution is an outlier.

In some examples, multiple loss contributions are determined for each ground truth object over time during the selected time period, and a percent improvement of the loss contribution over the selected time period is determined. If a ground truth object loss contribution does not improve over time, the ground truth object may be interfering with the training. At step 406, if the percent improvement of the loss contribution is below a selected threshold, the method proceeds to step 408 and the ground truth object is either down-weighted or removed from the training dataset. In some examples, whether the ground truth object is down-weighted or removed depends on the loss contribution of the ground truth object such that a ground truth object with a high loss contribution may be removed while a ground truth object with a lower loss contribution may be down-weighted.

In some examples, an average loss contribution per ground truth object over the selected time period is determined, as well as an overall average loss contribution for the set of ground truth objects. At step 406, it is determined if the ground truth object loss contribution exceeds a threshold, where the threshold is based on the overall average loss contribution for the set of ground truth objects. In some examples, ground truth objects with loss contributions significantly higher than the threshold can be identified as outliers. At step 408, the outlier ground truth objects are either down-weighted or removed from the training dataset, and an updated training dataset is generated.

At step 408, in the cases where a ground truth object is down-weighted (and not removed from the training dataset), a per object weight score is determined based on the loss contribution of the ground truth object. The weight score is applied to the corresponding ground truth object loss during each subsequent training step before the ground truth object loss is summed to the overall scene loss or sample loss.

In some examples, steps 404, 406, and 408, including the analysis of the ground truth object loss contributions and the removal of ground truth objects from the training dataset occur after each epoch of data.

At step 410, it is determined whether there are additional time periods remaining in the training. In some examples, a time period is a training epoch. When there are additional time periods, the method proceeds to step 412, and the object detection module training is continued with the updated dataset generated at step 408. At step 414, loss contributions for each remaining ground truth object are determined over a subsequent time period, and the method returns to step 406 to determine if the ground truth loss contribution is an outlier.

FIG. 4B shows another method 450 for automatically removing ground truth data from a training dataset during training, and the method 450 can be performed offline after completion of the training of the object detection part. The method 450 begins at step 452, as object detection module training begins. The object detection module can receive a dataset having multiple frames, each frame including ground truth objects (already labeled objects) and sensor data.

At step 454, the training of the object detection module is completed. At step 456, the loss contribution for each ground truth object for each respective time period is determined. In particular, as described above with respect to step 404 of FIG. 4A, the loss contribution for each individual ground truth object over a selected period of time is determined. In some examples, there is a loss contribution value for each ground truth object. The selected period of time can include one or more epochs. In some examples, when the loss from a particular ground truth object remains high over one or several epochs, the ground truth object should be removed from the dataset or down-weighted. In various examples, the contribution loss is computed in a way that tracks the loss contribution from each ground truth object individually in a training scene. In various examples, as discussed with respect to the method 400 of FIG. 4A, multiple loss contributions for each ground truth object can be determined. For example, a loss contribution for each ground truth object for each epoch of the training dataset can be determined. In other examples, other time windows can be used for determining one or more loss contributions for each ground truth object. For instance, there can be one loss contribution value per {object ID, scene ID} pair for each epoch within a time window. At step 458, it is determined, for each loss contribution value, whether the loss contribution is an outlier.

In some examples, a percent improvement of the loss contribution over a selected time period (e.g., over the training dataset) is determined. If a ground truth object loss contribution does not improve over time, the ground truth object may be interfering with the training. At step 458, if the percent improvement of the loss contribution is below a selected threshold, the method proceeds to step 460 and the ground truth object is either down-weighted or removed from the training dataset. In some examples, the ground truth objects identified as outliers are removed. In some examples, the ground truth objects identified as outliers are down-weighted, and the down-weighting factor depends on how far each respective outlier is above a selected threshold. The selected threshold can be an adaptive threshold. In some examples, whether the ground truth object is down-weighted or removed depends on the loss contribution of the ground truth object such that a ground truth object with a high loss contribution may be removed while a ground truth object with a lower loss contribution may be down-weighted.

In some examples, at step 456, an average loss contribution per ground truth object over the selected time period is determined, as well as an overall average loss contribution for the set of ground truth objects. At step 458, it is determined if the ground truth object loss contribution exceeds a threshold, where the threshold is based on the overall average loss contribution for the set of ground truth objects. In some examples, ground truth objects with loss contributions significantly higher than the threshold can be identified as outliers. At step 460, the outlier ground truth objects are either down-weighted or removed from the training dataset, and an updated training dataset is generated.

For ground truth objects that have loss contributions that are not outliers (i.e., loss contributions that fall within an average range, and/or fall within a selected amount from the average range), the ground truth objects remain in the training dataset without change. At step 464, the training dataset is updated for use in subsequent trainings.

Figure 5A:
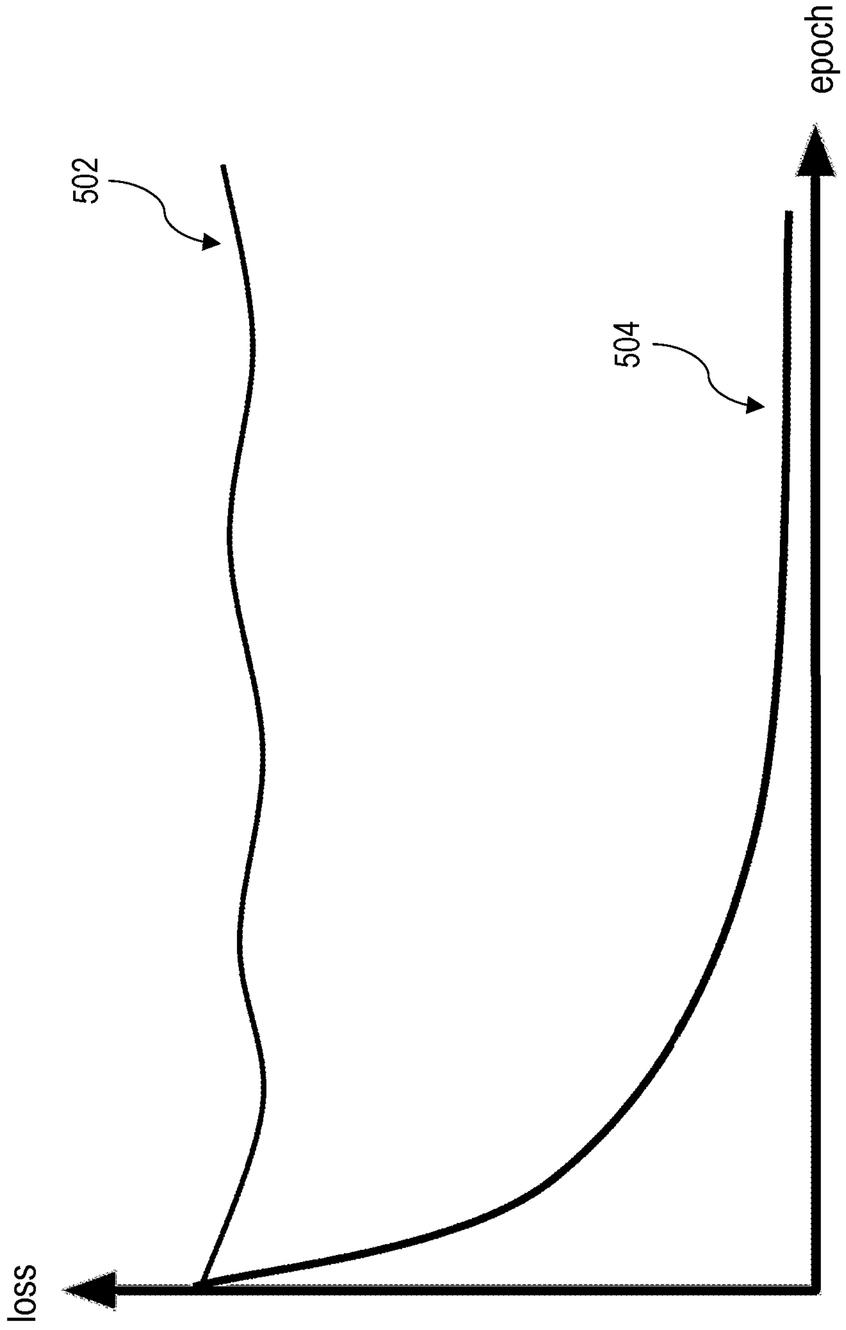
FIGS. 5A and 5B show graphs 500, 520 illustrating ground truth object loss contributions over multiple epochs, according to some aspects of the disclosed technology.
Figure 5B:
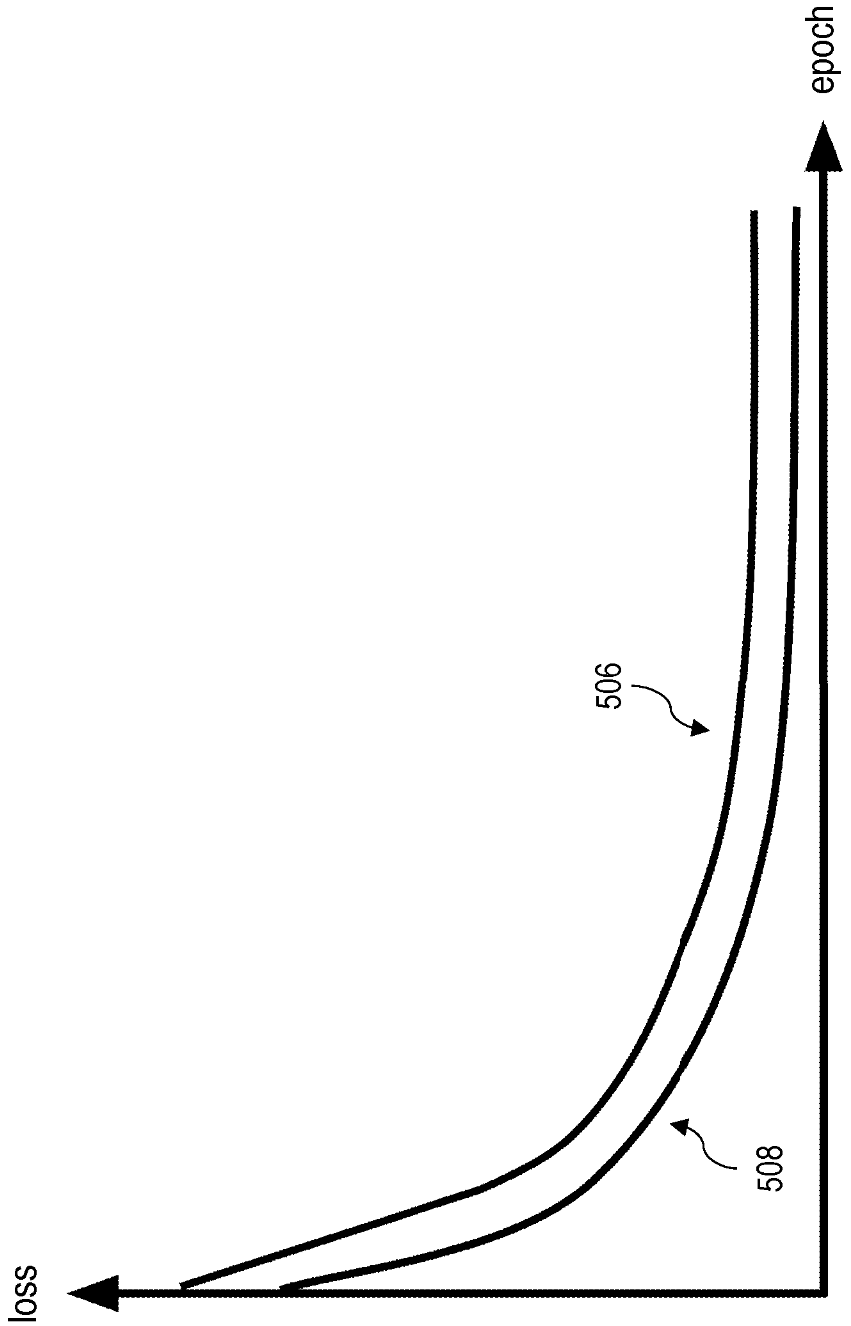

FIGS. 5A and 5B show graphs 500, 520 illustrating ground truth object loss contributions over multiple epochs, according to some examples of the disclosure. FIG. 5A shows an example of a qualitative loss contribution per ground truth object. In particular, the upper line 502 shows the loss contribution of a ground truth object without enough sensor data. As shown in the graph 500, the loss contribution 502 for the ground truth object without enough sensor data remains high over multiple epochs. In contrast, the lower line 504 shows the loss contribution of a ground truth object with enough sensor data. FIG. 5A illustrates how the training loss from a single object progresses over time. As shown in the graph 500, the loss contribution 504 quickly decreases as the model uses the sensor data to predict an object corresponding with the ground truth object.

FIG. 5B shows a graph 520 illustrating qualitative loss contributions from multiple ground truth objects. The upper line 506 illustrates the combined loss from all the ground truth objects. The lower line 504 shows the combined loss contribution of the ground truth objects with enough sensor data. FIG. 5B illustrates how the overall training loss progresses over time, and how the training loss from the subset of ground truth objects having enough sensor data progresses over time.

At first, as training begins, the relative loss contribution from the ground truth objects without enough sensor data is small because there is a low quantity of these objects in the training dataset. However, in later training stages and in later epochs, the relative loss contribution from the ground truth objects without enough sensor data is large, since their loss contribution remains virtually the same while the loss from the other ground truth objects decreases.

Figure 6:
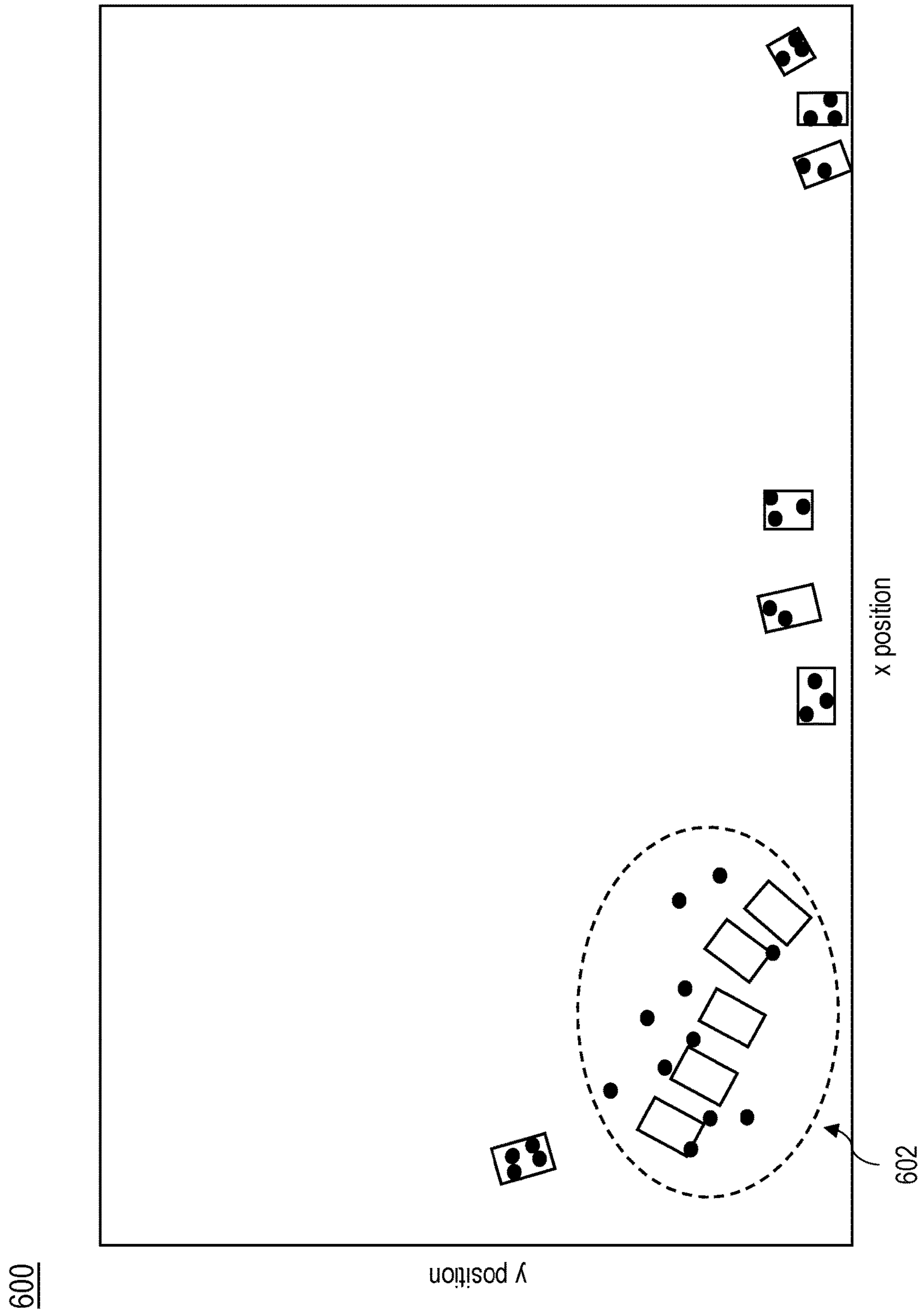
FIG. 6 is a diagram illustrating sensor data and ground truth objects that can be included in a training dataset, according to some aspects of the disclosed technology.

FIG. 6 is a diagram illustrating sensor data and ground truth objects that can be included in a training dataset, according to some examples of the disclosure. The ground truth objects are represented as boxes, while the sensor data is represented as dots. Many of the ground truth objects shown in the diagram overlap with the sensor data, such that an object detection module can generate predicted objects corresponding to the ground truth objects. However, as shown in FIG. 6, the ground truth objects in the circle 602 do not overlap with the sensor data in the circle 602, such that an object detection module will be unable to generate predicted objects corresponding with the ground truth objects in the circle 602. In this example, using the systems and methods discussed herein, including the methods 400 and 450, the ground truth objects in the circle 602 will be removed from the training dataset.

Example Autonomous Vehicle Management System

Figure 7:
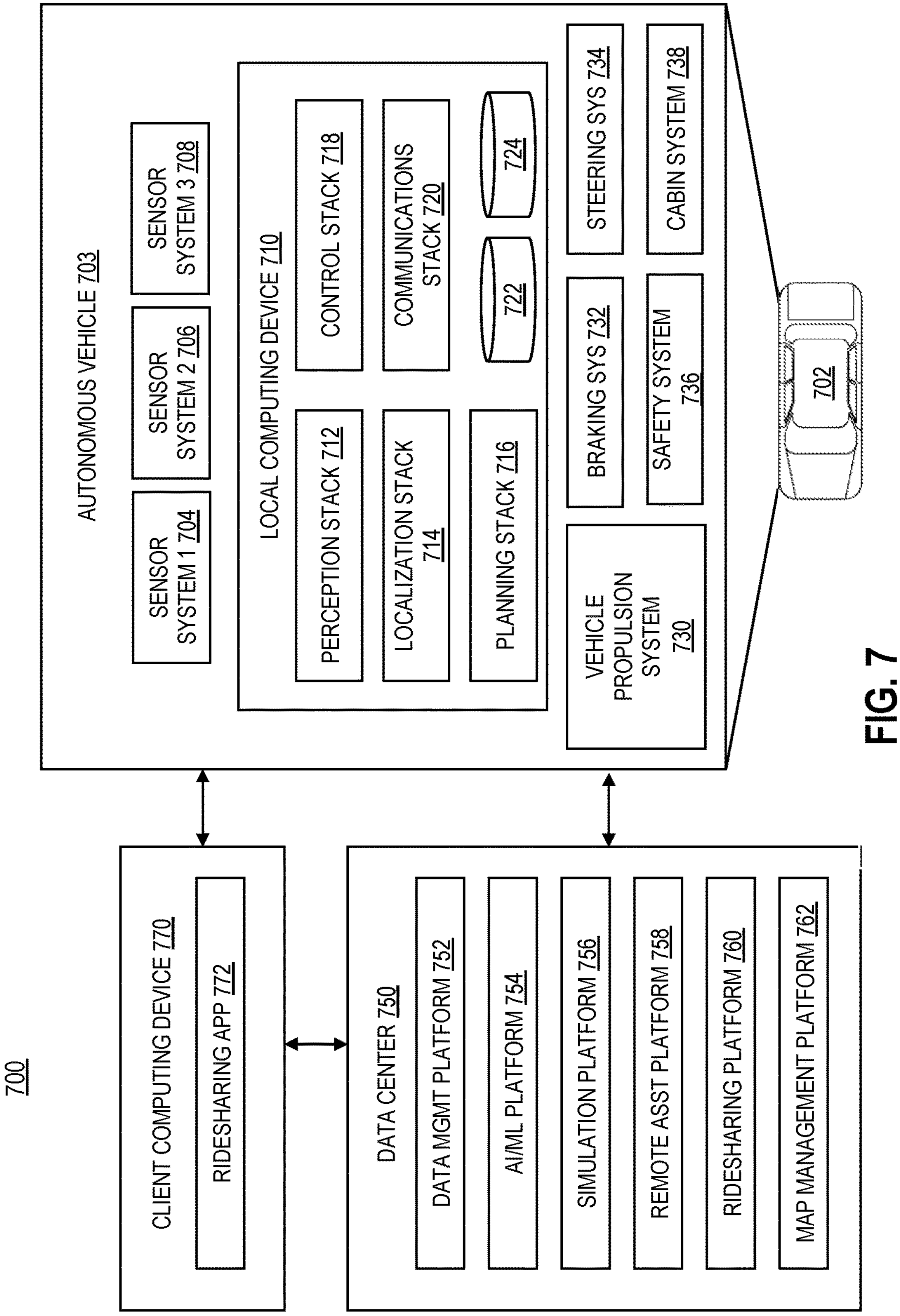
FIG. 7 illustrates an example system environment that can be used to facilitate autonomous vehicle (AV) dispatch and operations, according to some aspects of the disclosed technology.

Turning now to FIG. 7, this figure illustrates an example of an AV management system 700. One of ordinary skill in the art will understand that, for the AV management system 700 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 700 includes an AV 702, a data center 750, and a client computing device 770. In some examples, the AV 702 is the AV 130 of FIG. 1. The AV 702, the data center 750, and the client computing device 770 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 702 can navigate about roadways without a human driver based on sensor signals generated by multiple sensor systems 704, 706, and 708. The sensor systems 704-708 can include different types of sensors and can be arranged about the AV 702. For instance, the sensor systems 704-708 can comprise Inertial Measurement Units (IMUs), cameras (e.g., still image cameras, video cameras, etc.), light sensors (e.g., lidar systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 704 can be a camera system, the sensor system 706 can be a lidar system, and the sensor system 708 can be a RADAR system. Other embodiments may include any other number and type of sensors. In various examples, the sensor systems can be used to provide surveillance of the environment surrounding the vehicle. In some examples, the vehicle object detection module can use vehicle sensor data to observe the surrounding environment and identify both static and moving objects.

AV 702 can also include several mechanical systems that can be used to maneuver or operate AV 702. For instance, the mechanical systems can include vehicle propulsion system 730, braking system 732, steering system 734, safety system 736, and cabin system 738, among other systems. Vehicle propulsion system 730 can include an electric motor, an internal combustion engine, or both. The braking system 732 can include an engine brake, a wheel braking system (e.g., a disc braking system that utilizes brake pads), hydraulics, actuators, and/or any other suitable componentry configured to assist in decelerating AV 702. The steering system 734 can include suitable componentry configured to control the direction of movement of the AV 702 during navigation. Safety system 736 can include lights and signal indicators, a parking brake, airbags, and so forth. The cabin system 738 can include cabin temperature control systems, in-cabin entertainment systems, and so forth. In some embodiments, the AV 702 may not include human driver actuators (e.g., steering wheel, handbrake, foot brake pedal, foot accelerator pedal, turn signal lever, window wipers, etc.) for controlling the AV 702. Instead, the cabin system 738 can include one or more client interfaces (e.g., Graphical User Interfaces (GUIs), Voice User Interfaces (VUIs), etc.) for controlling certain aspects of the mechanical systems 730-738.

AV 702 can additionally include a local computing device 710 that is in communication with the sensor systems 704-708, the mechanical systems 730-738, the data center 750, and the client computing device 770, among other systems. The local computing device 710 can include one or more processors and memory, including instructions that can be executed by the one or more processors. The instructions can make up one or more software stacks or components responsible for controlling the AV 702; communicating with the data center 750, the client computing device 770, and other systems; receiving inputs from riders, passengers, and other entities within the AV's environment; logging metrics collected by the sensor systems 704-708; and so forth. In this example, the local computing device 710 includes a perception stack 712, a mapping and localization stack 714, a planning stack 716, a control stack 718, a communications stack 720, a High Definition (HD) geospatial database 722, and an AV operational database 724, among other stacks and systems.

Perception stack 712 can enable the AV 702 to "see" (e.g., via cameras, lidar sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 704-708, the mapping and localization stack 714, the HD geospatial database 722, other components of the AV, and other data sources (e.g., the data center 750, the client computing device 770, third-party data sources, etc.). The perception stack 712 can detect and classify objects and determine their current and predicted locations, speeds, directions, and the like. In some examples, the perception stack 712 includes an object detection module as described herein. In addition, the perception stack 712 can determine the free space around the AV 702 (e.g., to maintain a safe distance from other objects, change lanes, park the AV, etc.). The perception stack 712 can also identify environmental uncertainties, such as where to look for moving objects, flag areas that may be obscured or blocked from view, and so forth. The perception stack 712 can be used by the object detection module to sense the vehicle environment and identify objects.

Mapping and localization stack 714 can determine the AV's position and orientation (pose) using different methods from multiple systems (e.g., GPS, IMUs, cameras, lidar, RADAR, ultrasonic sensors, the HD geospatial database 722, etc.). For example, in some embodiments, the AV 702 can compare sensor data captured in real-time by the sensor systems 704-708 to data in the HD geospatial database 722 to determine its precise (e.g., accurate to the order of a few centimeters or less) position and orientation. The AV 702 can focus its search based on sensor data from one or more first sensor systems (e.g., GPS) by matching sensor data from one or more second sensor systems (e.g., lidar). If the mapping and localization information from one system is unavailable, the AV 702 can use mapping and localization information from a redundant system and/or from remote data sources.

The planning stack 716 can determine how to maneuver or operate the AV 702 safely and efficiently in its environment. For example, the planning stack 716 can receive the location, speed, and direction of the AV 702, geospatial data, data regarding objects sharing the road with the AV 702 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 702 from one point to another. The planning stack 716 can determine multiple sets of one or more mechanical operations that the AV 702 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 716 can select from multiple backup plans to carry out. For example, while preparing to change lanes to turn right at an intersection, another vehicle may aggressively cut into the destination lane, making the lane change unsafe. The planning stack 716 could have already determined an alternative plan for such an event, and upon its occurrence, help to direct the AV 702 to go around the block instead of blocking a current lane while waiting for an opening to change lanes.

The control stack 718 can manage the operation of the vehicle propulsion system 730, the braking system 732, the steering system 734, the safety system 736, and the cabin system 738. The control stack 718 can receive sensor signals from the sensor systems 704-708 as well as communicate with other stacks or components of the local computing device 710 or a remote system (e.g., the data center 750) to effectuate operation of the AV 702. For example, the control stack 718 can implement the final path or actions from the multiple paths or actions provided by the planning stack 716. This can involve turning the routes and decisions from the planning stack 716 into commands for the actuators that control the AV's steering, throttle, brake, and drive unit.

The communication stack 720 can transmit and receive signals between the various stacks and other components of the AV 702 and between the AV 702, the data center 750, the client computing device 770, and other remote systems. The communication stack 720 can enable the local computing device 710 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 720 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 722 can store HD maps and related data of the streets upon which the AV 702 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 724 can store raw AV data generated by the sensor systems 704-708 and other components of the AV 702 and/or data received by the AV 702 from remote systems (e.g., the data center 750, the client computing device 770, etc.). In some embodiments, the raw AV data can include HD lidar point cloud data, image or video data, RADAR data, GPS data, and other sensor data that the data center 750 can use for creating or updating AV geospatial data as discussed further below with respect to FIG. 5 and elsewhere in the present disclosure.

The data center 750 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 750 can include one or more computing devices remote to the local computing device 710 for managing a fleet of AVs and AV-related services. For example, in addition to managing the AV 702, the data center 750 may also support a ridesharing service, a delivery service, a remote/roadside assistance service, street services (e.g., street mapping, street patrol, street cleaning, street metering, parking reservation, etc.), and the like.

The data center 750 can send and receive various signals to and from the AV 702 and the client computing device 770. These signals can include sensor data captured by the sensor systems 704-708, roadside assistance requests, software updates, ridesharing pick-up and drop-off instructions, and so forth. In this example, the data center 750 includes one or more of a data management platform 752, an Artificial Intelligence/Machine Learning (AI/ML) platform 754, a simulation platform 756, a remote assistance platform 758, a ridesharing platform 760, and a map management platform 762, among other systems.

Data management platform 752 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 750 can access data stored by the data management platform 752 to provide their respective services.

The AI/ML platform 754 can provide the infrastructure for training and evaluating machine learning algorithms for operating the AV 702, the simulation platform 756, the remote assistance platform 758, the ridesharing platform 760, the map management platform 762, and other platforms and systems. Using the AI/ML platform 754, data scientists can prepare data sets from the data management platform 752; select, design, and train machine learning models; evaluate, refine, and deploy the models; maintain, monitor, and retrain the models; and so on.

The simulation platform 756 can enable testing and validation of the algorithms, machine learning models, neural networks, and other development efforts for the AV 702, the remote assistance platform 758, the ridesharing platform 760, the map management platform 762, and other platforms and systems. The simulation platform 756 can replicate a variety of driving environments and/or reproduce real-world scenarios from data captured by the AV 702, including rendering geospatial information and road infrastructure (e.g., streets, lanes, crosswalks, traffic lights, stop signs, etc.) obtained from the map management platform 762; modeling the behavior of other vehicles, bicycles, pedestrians, and other dynamic elements; simulating inclement weather conditions, different traffic scenarios; and so on.

The remote assistance platform 758 can generate and transmit instructions regarding the operation of the AV 702. For example, in response to an output of the AI/ML platform 754 or other system of the data center 750, the remote assistance platform 758 can prepare instructions for one or more stacks or other components of the AV 702.

The ridesharing platform 760 can interact with a customer of a ridesharing service via a ridesharing application 772 executing on the client computing device 770. The client computing device 770 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 772. The client computing device 770 can be a customer's mobile computing device or a computing device integrated with the AV 702 (e.g., the local computing device 710). The ridesharing platform 760 can receive requests to be picked up or dropped off from the ridesharing application 772 and dispatch the AV 702 for the trip.

Map management platform 762 can provide a set of tools for the manipulation and management of geographic and spatial (geospatial) and related attribute data. The data management platform 752 can receive lidar point cloud data, image data (e.g., still image, video, etc.), RADAR data, GPS data, and other sensor data (e.g., raw data) from one or more AVs 702, Unmanned Aerial Vehicles (UAVs), satellites, third-party mapping services, and other sources of geospatially referenced data. The raw data can be processed, and map management platform 762 can render base representations (e.g., tiles (2D), bounding volumes (3D), etc.) of the AV geospatial data to enable users to view, query, label, edit, and otherwise interact with the data. Map management platform 762 can manage workflows and tasks for operating on the AV geospatial data. Map management platform 762 can control access to the AV geospatial data, including granting or limiting access to the AV geospatial data based on user-based, role-based, group-based, task-based, and other attribute-based access control mechanisms. Map management platform 762 can provide version control for the AV geospatial data, such as to track specific changes that (human or machine) map editors have made to the data and to revert changes when necessary. Map management platform 762 can administer release management of the AV geospatial data, including distributing suitable iterations of the data to different users, computing devices, AVs, and other consumers of HD maps. Map management platform 762 can provide analytics regarding the AV geospatial data and related data, such as to generate insights relating to the throughput and quality of mapping tasks.

In some embodiments, the map viewing services of map management platform 762 can be modularized and deployed as part of one or more of the platforms and systems of the data center 750. For example, the AI/ML platform 754 may incorporate the map viewing services for visualizing the effectiveness of various object detection or object classification models, the simulation platform 756 may incorporate the map viewing services for recreating and visualizing certain driving scenarios, the remote assistance platform 758 may incorporate the map viewing services for replaying traffic incidents to facilitate and coordinate aid, the ridesharing platform 760 may incorporate the map viewing services into the client application 772 to enable passengers to view the AV 702 in transit en route to a pick-up or drop-off location, and so on.

Example of a Computing System for an Object Detection Module

Figure 8:
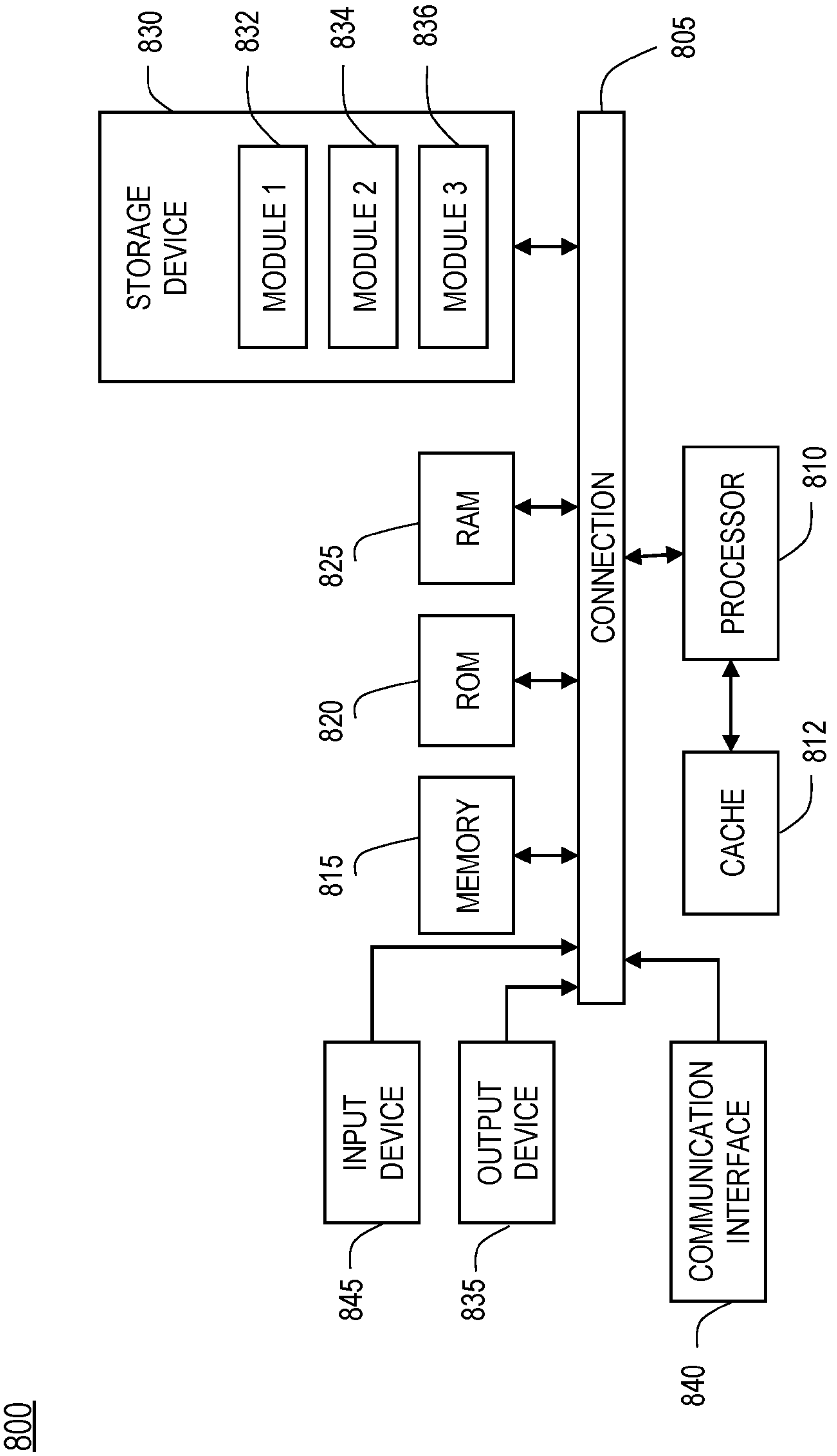
FIG. 8 shows an example embodiment of a system for implementing certain aspects of the present technology.

FIG. 8 shows an example embodiment of a computing system 800 for implementing certain aspects of the present technology. In various examples, the computing system 800 can be any computing device making up the onboard computer 104, the central computer 502, or any other computing system described herein. The computing system 800 can include any component of a computing system described herein which the components of the system are in communication with each other using connection 805. The connection 805 can be a physical connection via a bus, or a direct connection into processor 810, such as in a chipset architecture. The connection 805 can also be a virtual connection, networked connection, or logical connection.

In some implementations, the computing system 800 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices. For example, the components can include a simulation system, an artificial intelligence system, a machine learning system, and/or a neural network.

The example system 800 includes at least one processing unit (central processing unit (CPU) or processor) 810 and a connection 805 that couples various system components including system memory 815, such as read-only memory (ROM) 820 and random access memory (RAM) 825 to processor 810. The computing system 800 can include a cache of high-speed memory 812 connected directly with, in close proximity to, or integrated as part of the processor 810.

The processor 810 can include any general-purpose processor and a hardware service or software service, such as services 832, 834, and 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric. In some examples, a service 832, 834, 836 is an object detection reaction module, and is configured to detect environmental surroundings and identify objects in a vehicle's environment. The object detection module can include a machine learning model for identifying objects and the machine learning model can be configured to remove ground truth objects with high loss contributions.

To enable user interaction, the computing system 800 includes an input device 845, which can represent any number of input mechanisms, such as a microphone for speech, a touch-sensitive screen for gesture or graphical input, keyboard, mouse, motion input, speech, etc. The computing system 800 can also include an output device 835, which can be one or more of a number of output mechanisms known to those of skill in the art. In some instances, multimodal systems can enable a user to provide multiple types of input/output to communicate with the computing system 800. The computing system 800 can include a communications interface 840, which can generally govern and manage the user input and system output. There is no restriction on operating on any particular hardware arrangement, and therefore the basic features here may easily be substituted for improved hardware or firmware arrangements as they are developed.

A storage device 830 can be a non-volatile memory device and can be a hard disk or other types of computer-readable media which can store data that are accessible by a computer, such as magnetic cassettes, flash memory cards, solid state memory devices, digital versatile disks, cartridges, RAMs, ROMs, and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as a processor 810, a connection 805, an output device 835, etc., to carry out the function.

In various implementations, the routing coordinator is a remote server or a distributed computing system connected to the autonomous vehicles via an Internet connection. In some implementations, the routing coordinator is any suitable computing system. In some examples, the routing coordinator is a collection of autonomous vehicle computers working as a distributed system.

Figure 9:
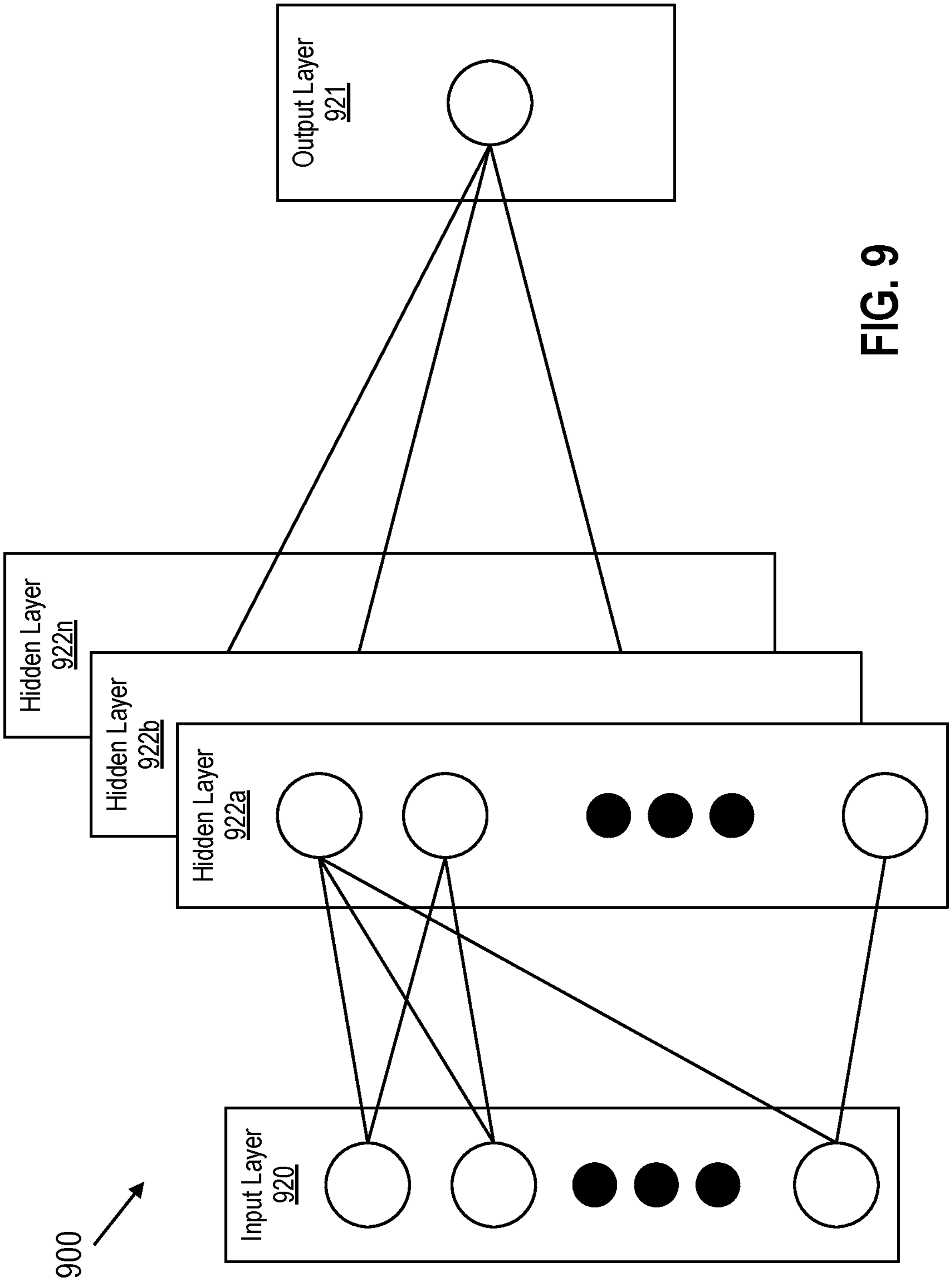
FIG. 9 illustrates an example of a deep learning neural network that can be used to implement a perception module and/or one or more validation modules, according to some aspects of the disclosed technology.

In FIG. 9, the disclosure now turns to a further discussion of models that can be used through the environments and techniques described herein. Specifically, FIG. 9 is an illustrative example of a deep learning neural network 900 that can be used to implement all or a portion of a perception module (or perception system) as discussed above. An input layer 920 can be configured to receive sensor data and/or data relating to an environment surrounding an autonomous vehicle, including objects. The neural network 900 includes multiple hidden layers 922*a*, 922*b*, through 922*n*. The hidden layers 922*a*, 922*b*, through 922*n* include "n" number of hidden layers, where "n" is an integer greater than or equal to one. The number of hidden layers can be made to include as many layers as needed for the given application. The neural network 800 further includes an output layer 921 that provides an output resulting from the processing performed by the hidden layers 922*a*, 922*b*, through 922*n*. In one illustrative example, the output layer 921 can provide various environmental parameters, that can be used/ingested by a differential simulator to identify objects in an AV's environment.

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922*a*. For example, as shown, each of the input nodes of the input layer 920 is connected to each of the nodes of the first hidden layer 922*a*. The nodes of the first hidden layer 922*a* can transform the information of each input node by applying activation functions to the input node information. The information derived from the transformation can then be passed to and can activate the nodes of the next hidden layer 922*b*, which can perform their own designated functions. Example functions include convolutional, up-sampling, data transformation, and/or any other suitable functions. The output of the hidden layer 922*b* can then activate nodes of the next hidden layer, and so on. The output of the last hidden layer 922*n* can activate one or more nodes of the output layer 921, at which an output is provided. In some cases, while nodes in the neural network 900 are shown as having multiple output lines, a node can have a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922*a*, 922*b*, through 922*n* in order to provide the output through the output layer 921.

In some cases, the neural network 900 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 900 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $$E\_total = \sum\left(\frac{1}{2}\text{target}-\text{output}\right)^2\bigg).$$

The loss can be set to be equal to the value of E_total.

The loss (or error) will be high for the initial training data since the actual values will be much different than the predicted output. The goal of training is to minimize the amount of loss so that the predicted output is the same as the training output. The neural network 900 can perform a backward pass by determining which inputs (weights) most contributed to the loss of the network, and can adjust the weights so that the loss decreases and is eventually minimized.

The neural network 900 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 900 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a system for training an object detection module, comprising: a training dataset including a plurality of ground truth objects and sensor data; the object detection module configured to: receive a training dataset; detect predicted objects based on the sensor data; a computing system for training the object detection module, configured to: evaluate the predicted objects after a first time period; determine a first loss contribution for each ground truth object of the plurality of ground truth objects over the first time period; determine, for each ground truth object of the plurality of ground truth objects, whether the first loss contribution exceeds a threshold; identify a subset of the plurality of ground truth objects for which the first loss contribution exceeds a threshold; down-weight each ground truth object in the subset; update the training dataset to replace each ground truth object in the subset with a corresponding down-weighted ground truth object to generate an updated training dataset, wherein the updated training dataset is transmitted to the object detection module, and the object detection module is configured to detect updated predicted objects based on the updated training dataset; and evaluate the updated predicted objects after a second time period.

Example 2 provides a system or method according to any of the preceding or following examples, wherein the object detection module is further configured to detect a plurality of predicted objects based on the sensor data.

Example 3 provides a system or method according to any of the preceding or following examples, wherein the computing system is further configured to determine, for each ground truth object, a difference between the respective ground truth object and a corresponding predicted object of the plurality of predicted objects.

Example 4 provides a system or method according to any of the preceding or following examples, wherein the computing system is further configured to determine the first loss contribution for each ground truth object by determining the first loss contribution based on the difference.

Example 5 provides a system or method according to any of the preceding or following examples, wherein the computing system is further configured to determine, for each ground truth object of the plurality of ground truth objects, whether the first loss contribution is an outlier including: determining a percent improvement in the first loss contribution over the first time period; and determining that the percent improvement is below a threshold.

Example 6 provides a system or method according to any of the preceding or following examples, wherein the computing system is further configured to determine, for each ground truth object of the plurality of ground truth objects, whether the first loss contribution is an outlier including: determining an average first loss contribution for the plurality of ground truth objects over the first time period; identifying a threshold loss contribution; and determining, for the subset, that the first loss contribution exceeds the threshold loss contribution.

Example 7 provides a system or method according to any of the preceding or following examples, wherein the computing system is further configured to down-weight each ground truth object in the subset including removing at least one ground truth object in the subset from the dataset.

Example 8 provides a computer-implemented method for training an object detection module in a vehicle, the method comprising: inputting a training dataset to the object detection module, wherein the training dataset includes a plurality of ground truth objects and sensor data; training the object detection module based on the training dataset for a first time period; determining a first loss contribution for each ground truth object of the plurality of ground truth objects over the first time period; determining, for each ground truth object of the plurality of ground truth objects, whether the first loss contribution is an outlier; identifying a subset of the plurality of ground truth objects for which the first loss contribution is an outlier; down-weighting each ground truth object in the subset; updating the training dataset to replace each ground truth object in the subset with a corresponding down-weighted ground truth object to generate an updated training dataset; and training the object detection module based on the updated training dataset for a second time period.

Example 9 provides a system or method according to any of the preceding or following examples, further comprising: detecting, by the object detection module, a plurality of predicted objects based on the sensor data.

Example 10 provides a system or method according to any of the preceding or following examples, further comprising: determining, for each ground truth object, a difference between the respective ground truth object and a corresponding predicted object of the plurality of predicted objects.

Example 11 provides a system or method according to any of the preceding or following examples, wherein determining the first loss contribution for each ground truth object includes determining the first loss contribution based on the difference.

Example 12 provides a system or method according to any of the preceding or following examples, wherein determining, for each ground truth object of the plurality of ground truth objects, whether the first loss contribution is an outlier includes: determining a percent improvement in the first loss contribution over the first time period; and determining that the percent improvement is below a threshold.

Example 13 provides a system or method according to any of the preceding or following examples, wherein determining, for each ground truth object of the plurality of ground truth objects, whether the first loss contribution is an outlier includes: determining an average first loss contribution for the plurality of ground truth objects over the first time period; identifying a threshold loss contribution; and determining, for the subset, that the first loss contribution exceeds the threshold loss contribution.

Example 14 provides a system or method according to any of the preceding or following examples, wherein down-weighting each ground truth object in the subset includes removing at least one ground truth object in the subset from the dataset.

Example 15 provides a computer-implemented method for training an object detection module in a vehicle, the method comprising: inputting a training dataset to the object detection module, wherein the training dataset includes a plurality of ground truth objects and sensor data; training the object detection module based on the training dataset; determining a first loss contribution for each ground truth object of the plurality of ground truth objects for a first epoch of the dataset; determining a second loss contribution for each ground truth object of the plurality of ground truth objects for a second epoch of the dataset; determining, for each ground truth object of the plurality of ground truth objects, a percentage change from the first loss contribution to the second loss contribution; determining an average percentage change across the plurality of ground truth objects; selecting a threshold percentage change that is less than the average; identifying a subset of the plurality of ground truth objects for which the respective percentage change is less than the threshold; down-weighting each ground truth object in the subset; and updating the training dataset to replace each ground truth object in the subset with a corresponding down-weighted ground truth object to generate an updated training dataset.

Example 16 provides a system or method according to any of the preceding or following examples, further comprising: detecting, by the object detection module, a plurality of predicted objects based on the sensor data.

Example 17 provides a system or method according to any of the preceding or following examples, further comprising: determining, for each ground truth object, a difference between the respective ground truth object and a corresponding predicted object of the plurality of predicted objects.

Example 18 provides a system or method according to any of the preceding or following examples, wherein determining the first loss contribution for each ground truth object includes determining the first loss contribution based on the difference.

Example 19 provides a system or method according to any of the preceding or following examples, wherein inputting the training dataset including the plurality of ground truth objects includes, for each ground truth object, providing an object identification and a scene identification pair.

Example 20 provides a system or method according to any of the preceding or following examples, wherein down-weighting each ground truth object in the subset includes removing at least one ground truth object in the subset from the dataset.

Example 21 includes one or more non-transitory computer-readable media storing instructions that, when executed by one or more processors, cause the one or more processors to perform any one of the computer-implemented methods of Examples 8-20.

Example 22 is an apparatus comprising means to carry out any one of the computer-implemented methods of Examples 8-20.

Example 23 is a computer system, comprising: a computer processor for executing computer program instructions; and one or more non-transitory computer-readable media storing computer program instructions executable by the computer processor to perform the method of any one of examples 8-20.

What is claimed is:

1. A system for training an object detection module to detect objects in an environment proximal to various sensors, the system comprising:

a non-transient computer-readable storage media and one or more processors operably coupled to the storage media, the object detection module, a training dataset, and program instructions are stored in the non-transient storage media, wherein the various sensors include radars, cameras, and lidars, and the training dataset includes a plurality of pre-labeled ground truth objects and sensor data from the various sensors, and the program instructions are configured to cause the one or more processors to:

provide the training dataset to the object detection module;

extract features from the sensor data based on the data from the various sensors and fuse the extracted features;

detect predicted objects based on the sensor data, wherein the detected predicted objects correspond to respective ground truth objects;

evaluate the predicted objects after a first time period of the dataset;

determine a first loss contribution for each ground truth object of the plurality of pre-labeled ground truth objects over the first time period;

determine a second loss contribution for each ground truth object of the plurality of pre-labeled ground truth objects for a second time period of the dataset;

determine, for each ground truth object of the plurality of pre-labeled ground truth objects, a percentage change from the first loss contribution to the second loss contribution;

determine an average percentage change across the plurality of pre-labeled ground truth objects;

select a threshold percentage change that is less than the average;

identify a subset of the plurality of ground truth objects for which the respective percentage change is less than the threshold;

down-weight each pre-labeled ground truth object in the subset;

update the training dataset to replace each pre-labeled ground truth object in the subset with a corresponding down-weighted ground truth object to generate an updated training dataset; and train the object detection module with the updated training dataset.

2. The system of claim 1, wherein the object detection module is further configured to detect a plurality of predicted objects based on the sensor data.

3. The system of claim 2, wherein the computing system is further configured to determine, for each ground truth object, a difference between the respective ground truth object and a corresponding predicted object of the plurality of predicted objects.

4. The system of claim 3, wherein the computing system is further configured to determine the first loss contribution for each ground truth object by determining the first loss contribution based on the difference.

5. The system of claim 1, wherein the computing system is configured to determine whether the first loss contribution is one of the plurality of outlier contributions by:

determining a percent improvement in the first loss contribution over the first time period; and determining that the percent improvement is below a threshold.

6. The system of claim 1, wherein the computing system is configured to determine whether the first loss contribution is one of the plurality of outlier contributions by:

determining an average first loss contribution for the plurality of ground truth objects over the first time period;

identifying a threshold loss contribution; and determining, for the subset, that the first loss contribution exceeds the threshold loss contribution.

7. The system of claim 1, wherein the computing system is further configured to down-weight each ground truth object in the subset including removing at least one ground truth object in the subset from the dataset.

8. A computer-implemented method for training an object detection module in a vehicle having various sensors including radars, cameras, and lidars, the method comprising:

inputting a training dataset to the object detection module, wherein the training dataset includes a plurality of pre-labeled ground truth objects and sensor data, wherein the sensor data includes data from the various sensors;

training the object detection module based on the training dataset for a first time period, including extracting features from the sensor data based on the data from the various sensors and fusing the extracted features to identify predicted objects based on the sensor data, wherein the generated predicted objects correspond to respective ground truth objects;

determining a first loss contribution for each ground truth object of the plurality of pre-labeled ground truth objects over the first time period;

determining a second loss contribution for each ground truth object of the plurality of pre-labeled ground truth objects, for a second time period of the dataset;

determining, for each ground truth object of the plurality of pre-labeled ground truth objects, a percentage change from the first loss contribution to the second loss contribution;

determining an average percentage change across the plurality of pre-labeled ground truth objects;

selecting a threshold percentage change that is less than the average;

identifying a subset of the plurality of pre-labeled ground truth objects for which the respective percentage change is less than the threshold;

down-weighting each pre-labeled ground truth object in the subset;

updating the training dataset to replace each pre-labeled ground truth object in the subset with a corresponding down-weighted ground truth object to generate an updated training dataset; and training the object detection module based on the updated training dataset.

9. The computer-implemented method of claim 8, further comprising: detecting, by the object detection module, a plurality of predicted objects based on the sensor data.

10. The computer-implemented method of claim 9, further comprising: determining, for each ground truth object, a difference between the respective ground truth object and a corresponding predicted object of the plurality of predicted objects.

11. The computer-implemented method of claim 10, wherein determining the first loss contribution for each ground truth object includes determining the first loss contribution based on the difference.

12. The computer-implemented method of claim 8, wherein determining, for each ground truth object of the plurality of ground truth objects, whether the first loss contribution is one of the plurality of outlier contributions includes:

determining a percent improvement in the first loss contribution over the first time period; and determining that the percent improvement is below a threshold.

13. The computer-implemented method of claim 8, wherein determining, for each ground truth object of the plurality of ground truth objects, whether the first loss contribution is one of the plurality of outlier contributions includes:

determining an average first loss contribution for the plurality of ground truth objects over the first time period;

identifying a threshold loss contribution; and determining, for the subset, that the first loss contribution exceeds the threshold loss contribution.

14. The computer-implemented method of claim 8, wherein down-weighting each ground truth object in the subset includes removing a first ground truth object in the subset from the dataset.

15. A computer-implemented method for training an object detection module in a vehicle having various sensors including radars, cameras, and lidars, the method comprising:

inputting a training dataset to the object detection module, wherein the training dataset includes a plurality of pre-labeled ground truth objects and sensor data, wherein the sensor data includes data from the various sensors;

training the object detection module based on the training dataset, including extracting features from the sensor data based on the data from the various sensors and fusing the extracted features to identify predicted objects based on the sensor data, wherein the generated predicted objects correspond to respective ground truth objects;

determining a first loss contribution for each ground truth object of the plurality of pre-labeled ground truth objects for a first epoch of the dataset;

determining a second loss contribution for each ground truth object of the plurality of pre-labeled ground truth objects for a second epoch of the dataset;

determining, for each ground truth object of the plurality of pre-labeled ground truth objects, a percentage change from the first loss contribution to the second loss contribution;

determining an average percentage change across the plurality of pre-labeled ground truth objects;

selecting a threshold percentage change that is less than the average;

identifying a subset of the plurality of pre-labeled ground truth objects for which the respective percentage change is less than the threshold;

down-weighting each pre-labeled ground truth object in the subset;

updating the training dataset to replace each pre-labeled ground truth object in the subset with a corresponding down-weighted ground truth object to generate an updated training dataset; and training the object detection module with the updated training dataset.

16. The computer-implemented method of claim 15, further comprising: detecting, by the object detection module, a plurality of predicted objects based on the sensor data.

17. The computer-implemented method of claim 16, further comprising: determining, for each ground truth object, a difference between the respective ground truth object and a corresponding predicted object of the plurality of predicted objects.

18. The computer-implemented method of claim 17, wherein determining the first loss contribution for each ground truth object includes determining the first loss contribution based on the difference.

19. The computer-implemented method of claim 15, wherein inputting the training dataset including the plurality of ground truth objects includes, for each ground truth object, providing an object identification and a scene identification pair.

20. The computer-implemented method of claim 15, wherein down-weighting each ground truth object in the subset includes removing a first ground truth object in the subset from the dataset.

* * * * *